T. H. TOMBYLL & L. BOTTGER.
FLAX ATTACHMENT FOR HARVESTERS.
APPLICATION FILED JAN. 5, 1917.
1,272,875.
Patented July 16, 1918.
5 SHEETS—SHEET 1.
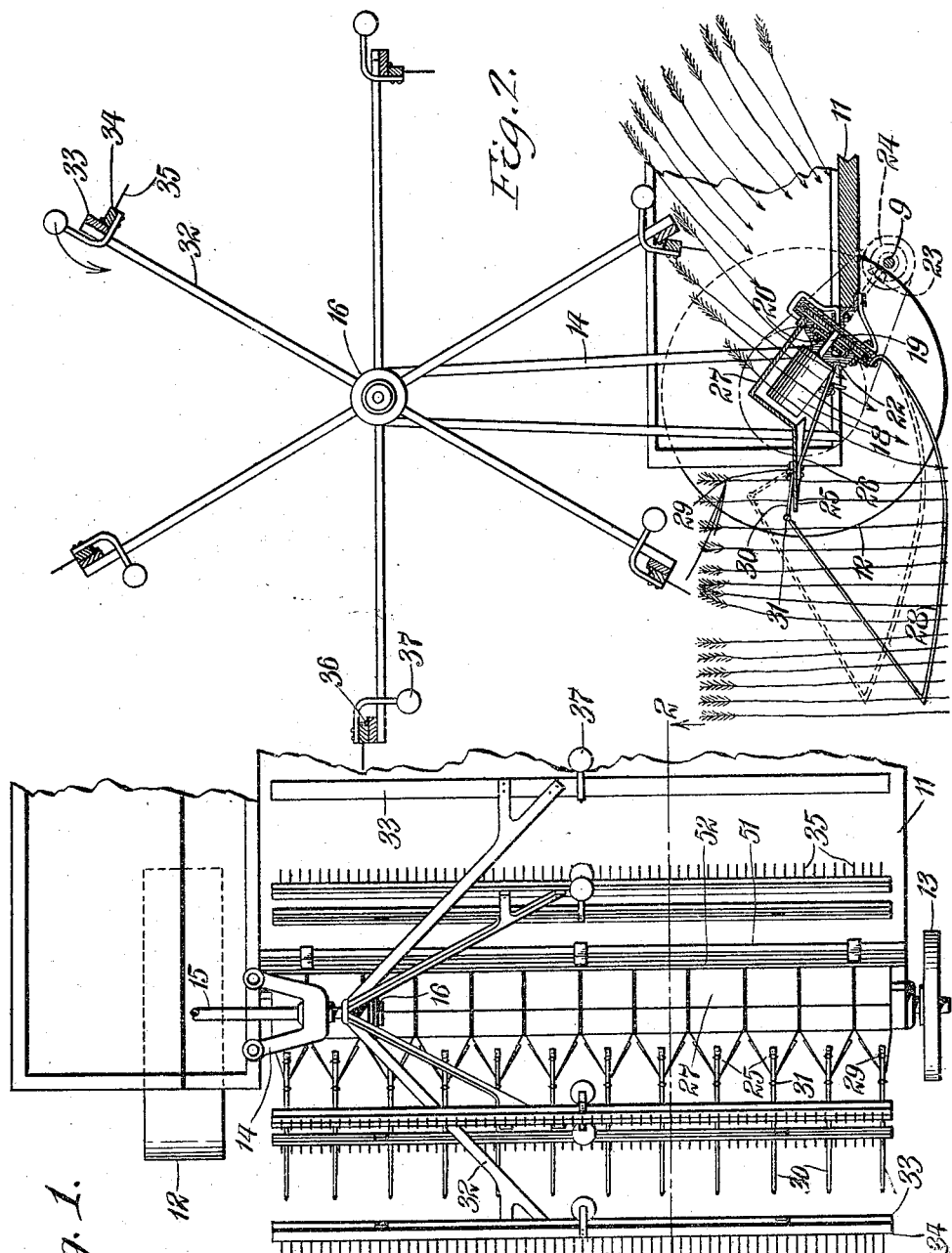
Inventors
Thomas Hansen Tombyll and Lorenz Bottger
Fetherstonhaugh & Co.
Attys.

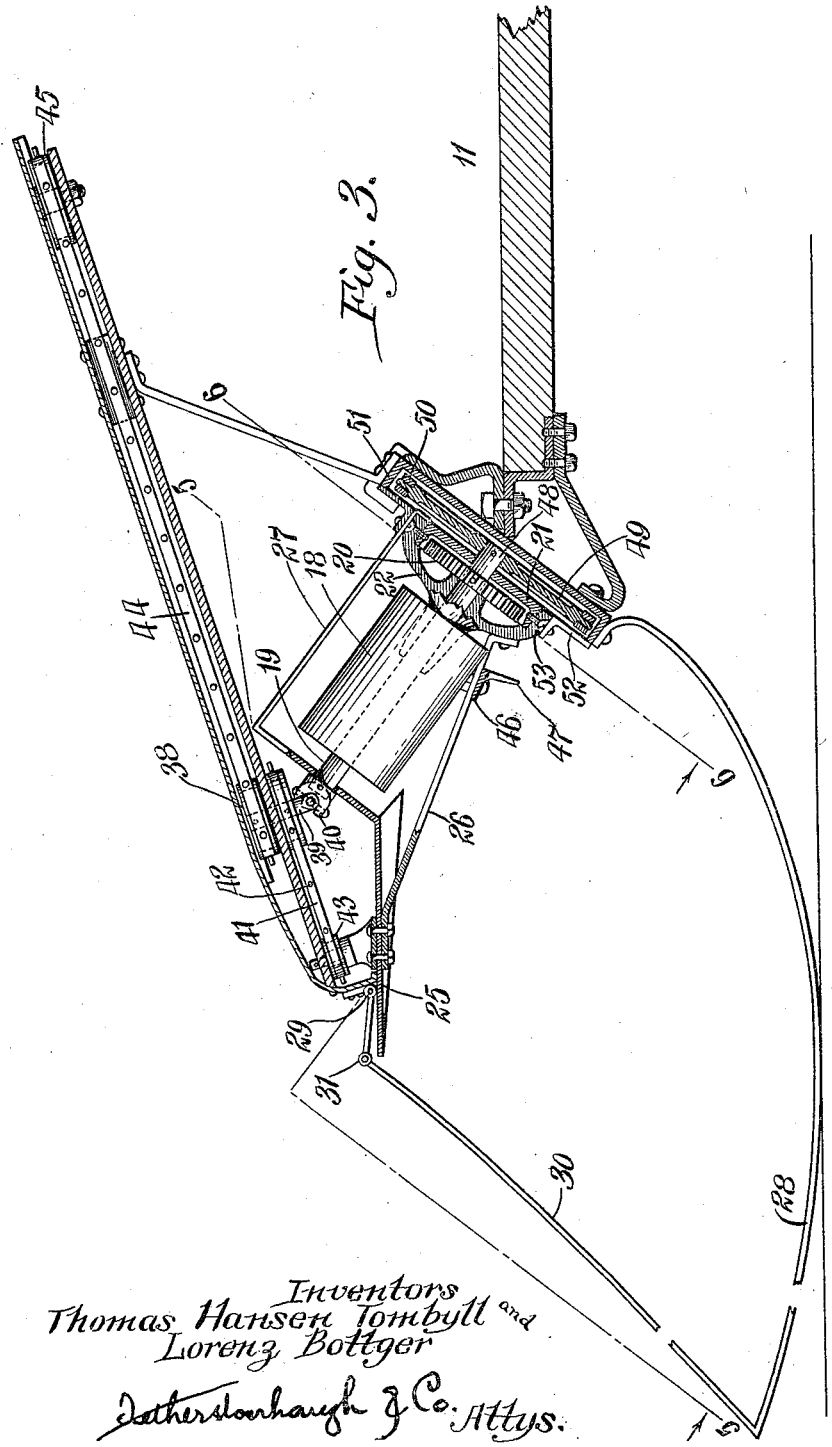

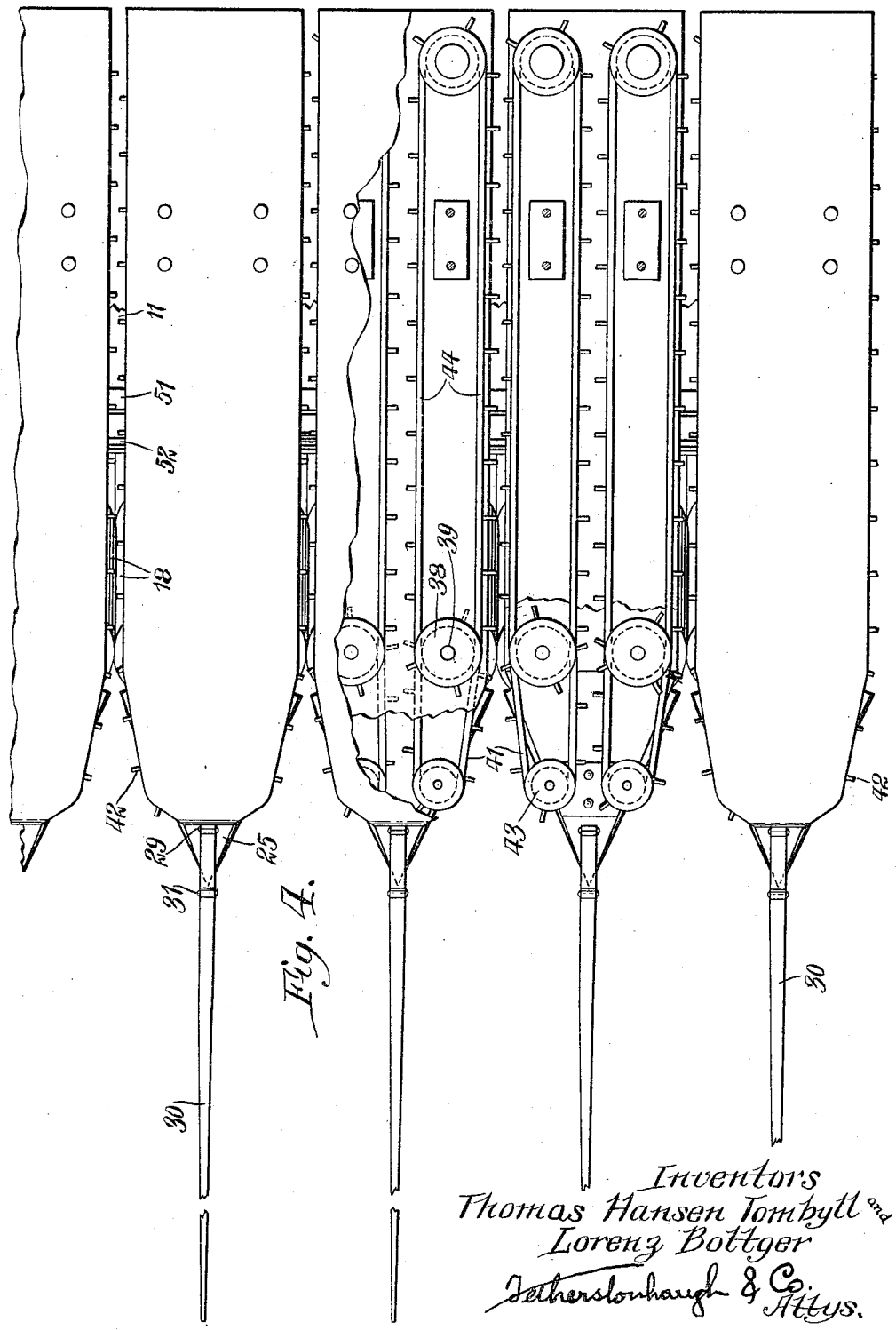

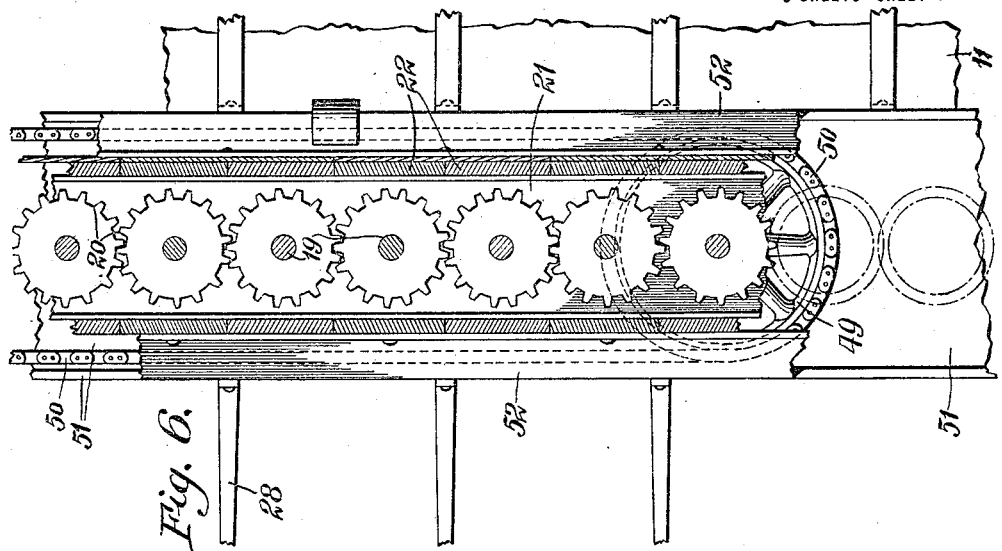
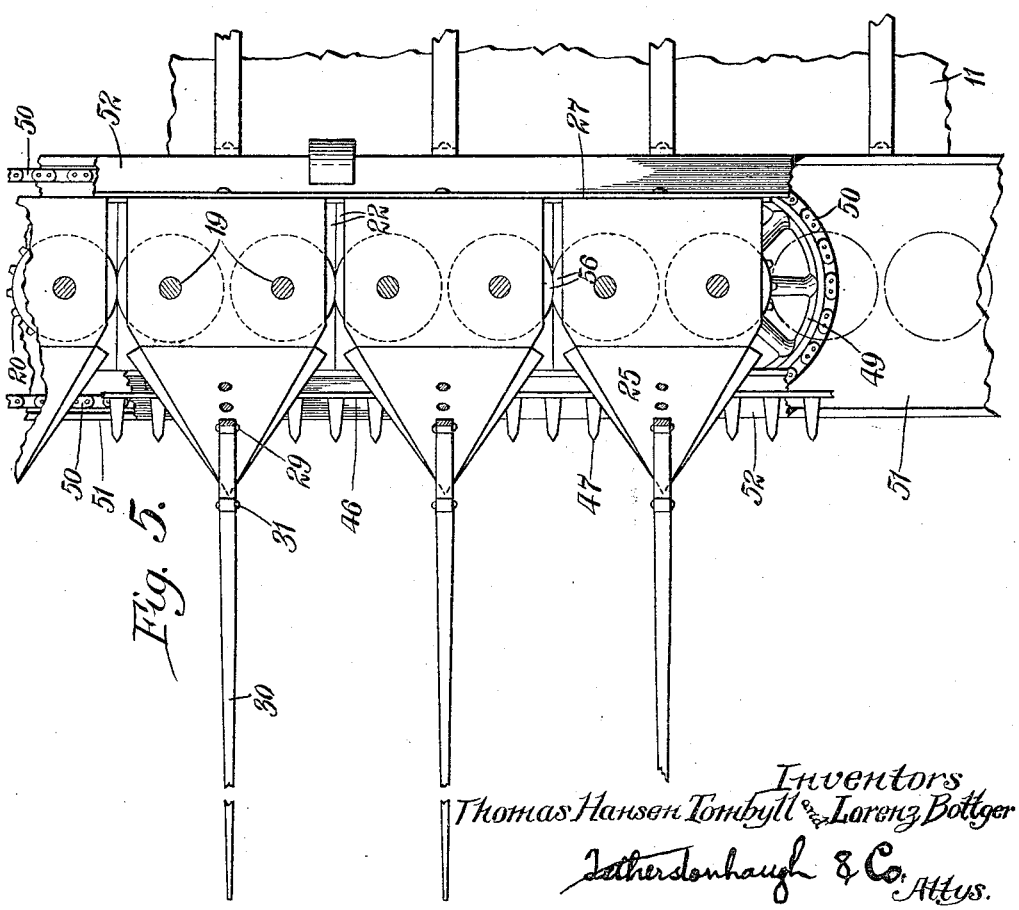

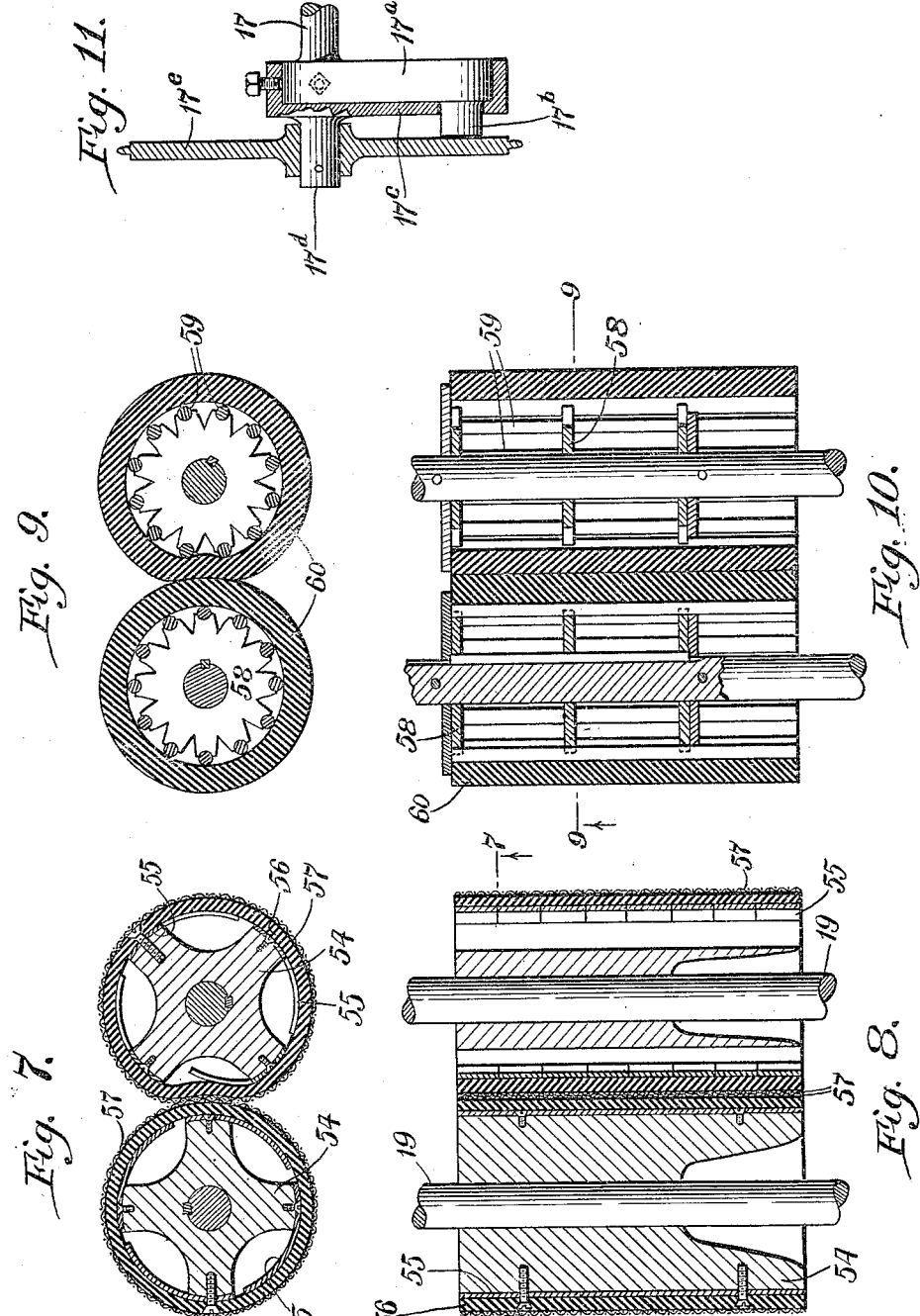

UNITED STATES PATENT OFFICE.

THOMAS HANSEN TOMBYLL, OF MONTREAL, CANADA, AND LORENZ BOTTGER, OF NEW YORK, N. Y., ASSIGNORS TO UNITED STATES FLAX HARVESTING CO. (INC.), OF CITY ISLAND, NEW YORK.

FLAX ATTACHMENT FOR HARVESTERS.

1,272,875.  Specification of Letters Patent.  Patented July 16, 1918.

Application filed January 5, 1917. Serial No. 140,799.

*To all whom it may concern:*

Be it known that we, THOMAS HANSEN TOMBYLL and LORENZ BOTTGER, a subject of the King of Great Britain and a citizen of Denmark, respectively, residing at Montreal, Canada, and City Island, New York city, N. Y., respectively, have invented a new and useful Improvement in Flax Attachments for Harvesters, of which the following is a specification.

This invention relates to attachments for a harvester whereby it may be utilized to pull flax and the object of the invention is to devise attachments of such a character that they will more efficiently perform the pulling function required of them and at the same time only require a minimum of energy from the forces propelling the harvester to drive them.

With this object in view, the invention consists in deformable pulling rolls, means for guiding flax into them, and the arrangement, construction, and combination of related parts hereinafter described and particularly pointed out in the claims, it being understood that we do not intend to limit ourselves to the details of construction.

The invention is illustrated in the accompanying drawings in which—

Figure 1 is a plan view of a harvester with modifications of our attachments in place.

Fig. 2 is a vertical longitudinal section of the device of Fig. 1 taken along the line 2—2, somewhat enlarged.

Fig. 3 is a vertical longitudinal section of the attachment in operative position.

Fig. 4 is a top plan view of the structure of Fig. 3 with parts broken away.

Fig. 5 is a sectional view of the structure of Fig. 4, with parts in section. It may be said to be a horizontal section taken along the lines 5—5 of Fig. 3.

Fig. 6 is a substantially horizontal section taken along the lines 6—6 of Fig. 3.

Figs. 7 and 8 are enlarged views of the rollers.

Figs. 9 and 10 are views similar to Figs. 7 and 8 of a modified form of roller.

Fig. 11 is an enlarged view of an attachment to a standard harvester whereby the rollers may be driven from the knife operating shaft thereof.

In the accompanying drawings, the numeral 11 represents a harvester having a main drive wheel 12, supporting wheel 13, reel support 14, a reel driving shaft 15, reel 16, and knife operating shaft 9, all as usual. The knives and fingers of the harvester are removed and in their stead is provided a row of inclined rolls 18, located on shafts 19, carrying a gear 20 on their lower end, which gears all mesh with each other and are located within a protective casing, the lower part 21 of which is substantially U shaped. The upper part 22 encircles the shaft 19 and is preferably substantially funnel shaped. One of the shafts 19 has a lower extension carrying a bevel gear 23, meshing with a similar gear 24 of the knife driving shaft 9. The shaft having this extension may be either about the middle of the row of rolls, at either end, or several shafts may be so fitted. 25 indicates dividers extending forwardly from the rolls having supporting brackets such as 26 and 27. 28 indicates a curved grain lifter extending forwardly from the casing of the roll driving mechanism. The lifter is preferably of the shape shown pivotally secured at 29, to the dividers 25 and the upward extension 30 of the lifter being jointed at 31.

The reel 16 represents the usual reel carried by harvesters, provided with arms 32, carrying blades 33. Means are provided for guiding the flax between the rolls in the form of attachments for the reel which comprises supplemental blades 34 having teeth 35 extending therefrom to form a comb. These supplemental blades are hinged in any suitable detachable way to the usual blades 33 as at 36. 37 indicates weighted arms carried by the supplemental blades 34 in order to make them move inwardly and outwardly during rotation of the wheel, as clearly shown in Fig. 2.

Instead of using these reel means for guiding the flax between the rolls, we may use the device of Figs. 3 and 4 which comprises a double sprocket 38 or its equivalent connected to a shaft 39, which is driven by means of a universal joint 40 carried by the top of the shaft 19 of the roll 18. 41 represents a forwardly extending conveyer, preferably a chain whose links carry projections 42, taking around a sprocket 43, considerably smaller than sprocket 38, supported from the divider 25, so that it has something of a divider action. 44 indicates a rearwardly extending conveyer taking around a sprocket 45.

46 indicates a blocking bar, carried in advance of the lower end of the rolls 18 or their driving mechanism preferably upon the brace 26. This bar is toothed as at 47 in Fig. 5 and serves to guide the flax between the rolls and to prevent its getting tangled up, either under the rolls or in their driving mechanism and cleaning the roots.

Instead of driving the rolls by the arrangement shown in Fig. 2, we may drive them by the mechanism shown in Figs. 5 and 6, wherein the gears 20, carried by the roll shafts 19, mesh as previously described. The center shaft has a lower extension 48 and is provided with a sprocket 49 thereon, around which a chain 50 takes and is driven in any suitable manner. One way of driving the chain 50 is disclosed in Fig. 11, wherein 17 indicates a usual driving shaft on the harvester which is usually provided with a crank shaft 17ª and a pin 17ᵇ. To convert such a structure giving reciprocating motion back to one giving rotary motion, a casing 17ᶜ is provided adapted to fit over the crank 17ª, and 17ᵈ indicates a pin adapted to have a sprocket 17ᵉ secured thereto. The chain 50 may then be driven from this sprocket. While we have shown these rolls with the power applied to the middle as previously stated, we may apply it to the one at either end or several at intervals. A smaller casing may inclose the sprocket 49, and chain 50, as 21 and 22. Such casing is illustrated at 51 and 52. In Fig. 3, the upper and lower parts 21 and 22 may be secured together by any means, such as screws 53.

The rolls 18 are arranged so that pairs thereof contact and the dividing and guiding means direct the flax between the contacting rolls, whereby these rolls pull it. The structure of the pulling rolls is illustrated in Figs. 7 and 8, in which 54 indicates supporting arms, carried by the shafts 19. 55 indicates curved longitudinally extending springs, carried by the arms 54. 56 illustrates a rubber tube forming the periphery of the rolls, and 57 indicates a fabric covering for the rubber tube. The rolls are so set in relation to each other that their peripheries intersect. Their intersection is exaggerated to make this point clear but as illustrated, the rolls are alternately deformed at their point of contact with each other, and the spring members 55 aid in the return of the deformed portions to their normal position. The function of the resilient periphery of the rolls is two-fold, first, it is deformable to exert a positive pull upon the flax, and second, it is resilient to grip the flax. A homely illustration of their advantages over hard rolls would be the difference between trying to pull a stalk of flax by grasping it with two sticks and by grasping it with the fingers.

The structure of the rolls may be modified as shown in Figs. 9 and 10, in which arms 58 are provided with spaced longitudinally extending supports 59, which are preferably rounded. Over these is provided a rubber tube 60, but as rubber alone is used in this case, it is desirable to make this tube thicker than in the modification shown in Fig. 7. The deformation is the same in the two forms of rolls.

The operation of the device is as follows, it being assumed that the harvester has first had its usual cutting elements replaced by the flax pulling attachments because this invention is concerned more with the construction of the flax attachments *per se* rather than in any method or details of their attachments to the harvester except perhaps with the reel combs.

With the flax elements in place on the harvester as shown in Figs. 1 and 2, forward motion of the harvester rotates the reel. As one of the reel arms approaches the flax pulling rolls, the weight 37 of the comb 34 causes it to assume an extended position whereby it may engage the flax stalks to be pulled and continued rotation of the reel causes the comb to guide the flax past the dividers 25 to the contacting faces of the rolls. As soon as a reel arm is past the vertical, the comb begins to pivotally move inwardly because of the shifting of the center of gravity due to the weights 37 to free the comb of any flax that may have adhered to it. Continued revolutions of the reel will cause the combs to take the positions indicated. If any of the flax has fallen or is bent over, the grain lifter 28 will pick it up by means of its rearwardly inclined upper member until it is engaged by the pulling rolls. If an obstruction such as a stone is encountered, the lifter will move upwardly because of its pivotal connection at 29 and 31 so that it would, in reality, bound over the stone. As its lower curved member is not pivoted and is made of spring material, it will cause the return of the lifter to normal position as soon as the obstruction is passed. If for any reason the reel is not desired to be used, the arrangement shown in Fig. 3 could be used, wherein belts 41 and 44 will have the same function of directing the flax to the point of contact of the adjacent rolls. The forward conveyers 41 will have that particular function alone, while the rear conveyers 44 will assist and further assure the conveyance of the flax away from the rolls after it is pulled. In the arrangement shown in Fig. 3, the rolls are driven by means of contacting gears 20 carried by their shafts and one of the shafts is extended and carries a sprocket 49 thereof, which is driven by a chain 50 from any suitable source such as the special sprocket carrying attachment shown in Fig. 11 adapted to fit the usual knife operating shaft 17, so that the reciprocating motion imparted by the pin 17$^b$ is reconverted back to rotary motion. The shafts carrying the rolls have upward extensions and are equipped with a universal joint so that the sprockets 38, may be rotated whereby the conveyers 41 and 44 are positively driven. The construction shown in Fig. 1 at the base of the roll is especially adapted to completely house all the rolls operating parts, so that no flax or grit can come in contact with them and this arrangement has the further advantage of making it possible to maintain such elements properly lubricated. The blocking bar 46 has a double function of preventing any flax from getting past the rolls into the casing at the base of the rolls and of guiding the ends of the flax after they are pulled to pass between the rolls rather than to fall below the point of contact and also clean the roots. The rolls themselves alternately deform each other at the joint of contact as shown in Figs. 7 to 10, so that a positive pulling action takes place, but at the same time enough resilience is present to take care of the different diameters presented by the flax stalks and their roots.

What we claim is:

1. A flax pulling attachment for harvesters including pairs of co-acting hollow rolls, said rolls having a resilient periphery.

2. A flax pulling attachment for harvesters including pairs of co-acting hollow rolls, said rolls having a deformable periphery.

3. A flax pulling attachment for harvesters including a plurality of pairs of contacting hollow rolls deformable at their point of contact.

4. A flax pulling attachment for harvesters including a plurality of pairs of contacting rolls alternately deformable at their point of contact.

5. A flax pulling attachment for harvesters including pairs of co-acting rolls, said rolls having their peripheries intersecting.

6. A flax pulling attachment for harvesters including pairs of co-acting rolls, said rolls having a periphery of canvas supported upon rubber.

7. A flax pulling attachment for harvesters including a plurality of pairs of co-acting rolls, deformable exterior peripheries on said rolls, and spaced interior supports for said peripheries.

8. A flax pulling attachment for harvesters including a plurality of pairs of co-acting rolls, deformable exterior peripheries on said rolls, and spaced interior longitudinal supports for said peripheries.

9. A flax pulling attachment for harvesters including a plurality of pairs of co-acting rolls, with deformable peripheries, spaced interior supports for the peripheries, and resilient means for returning the peripheries to initial position after deformation.

10. A flax pulling attachment for harvesters including a plurality of pairs of co-acting rolls, with deformable peripheries, spaced interior supports for the peripheries, and resilient means between the supports for returning the peripheries to initial position after deformation.

11. A flax pulling attachment for harvesters including a plurality of pairs of co-acting rolls, with deformable peripheries, spaced interior supports for the peripheries, and resilient means carried by the supports for returning the peripheries to initial position after deformation.

12. A flax pulling attachment for harvesters including a plurality of pairs of co-acting rolls, with deformable peripheries, spaced interior supports for the peripheries and spring means for returning the peripheries to initial position after deformation.

13. A flax pulling attachment for harvesters including a row of co-acting pulling elements, means for driving said elements, guiding means located above said elements for directing the flax therebetween and means carried by the guiding means for bunching the flax fed to the pulling elements.

14. A flax pulling attachment for harvesters including a row of co-acting pulling elements, means for driving said elements, guiding means above said elements for directing all the flax therebetween, and toothed elements for conveying the flax in bunches.

15. A flax pulling attachment for harvesters including a row of co-acting pulling elements, means for driving said elements, guiding means located above and in advance of said elements and rake elements for directing the flax to the pulling elements in bunches.

16. A flax pulling attachment for harvesters including a row of co-acting pulling elements, means for driving said elements, rotary means located above said elements for directing the flax therebetween and means carried by said rotary means for bunching the flax fed to the pulling elements.

17. A flax pulling attachment for harvesters including a row of co-acting rolls, and means located above the rolls for directing the flax therebetween, said means comprising a rotary element located above and clear of the flax, and rake elements having relatively long teeth for feeding the flax to the rolls without knocking off any seed pods.

18. A flax pulling attachment for harvesters including a row of co-acting rolls, means for driving said rolls from below, and a flax guard for said driving means.

19. A flax pulling attachment for harvesters including a row of co-acting rolls, means for driving said rolls from below, and a flax guard for said driving means comprising a blocking bar.

20. A flax pulling attachment for harvesters including a row of co-acting rolls, means for driving said rolls from below, and a flax guard for said driving means comprising a toothed blocking bar.

21. A flax pulling attachment for harvesters including a row of co-acting rolls, dividers in front of pairs of said rolls, and a grain lifter pivotally connected to the dividers.

22. A flax pulling attachment for harvesters including a row of co-acting rolls, dividers in front of pairs of said rolls, and an upwardly movable grain lifter pivotally connected to the dividers.

23. A flax pulling attachment for harvesters including substantially hollow pulling rolls, rotatable shafts carrying the rolls, driving means for the shafts and a member having a tapered outline protecting said driving means and extending upwardly into the rolls encircling the shafts whereby a long bearing is provided for the shafts.

24. The device of claim 23 having the member funnel-shaped.

THOMAS HANSEN TOMBYLL.
LORENZ BOTTGER.

Copies of this patent may be obtained for five cents each, by addressing the "Commissioner of Patents, Washington, D. C."